(12) United States Patent
Cavieres Pinilla

(10) Patent No.: US 11,552,590 B2
(45) Date of Patent: Jan. 10, 2023

(54) SYSTEM FOR MOUNTING SOLAR PANELS

(71) Applicant: The Board of Regents of the University of Oklahoma, Norman, OK (US)

(72) Inventor: Andres F. Cavieres Pinilla, Norman, OK (US)

(73) Assignee: The Board of Regents of the University of Oklahoma, Norman, OK (US)

( * ) Notice: Subject to any disclaimer, the term of this patent is extended or adjusted under 35 U.S.C. 154(b) by 0 days.

(21) Appl. No.: 16/757,386

(22) PCT Filed: Oct. 8, 2019

(86) PCT No.: PCT/US2019/055260
§ 371 (c)(1),
(2) Date: Apr. 18, 2020

(87) PCT Pub. No.: WO2020/076870
PCT Pub. Date: Apr. 16, 2020

(65) Prior Publication Data
US 2021/0313926 A1 Oct. 7, 2021

Related U.S. Application Data

(60) Provisional application No. 62/742,713, filed on Oct. 8, 2018.

(51) Int. Cl.
*H02S 30/10* (2014.01)
*H02S 40/30* (2014.01)
(Continued)

(52) U.S. Cl.
CPC .......... *H02S 30/10* (2014.12); *F16B 5/0635* (2013.01); *F16B 5/0642* (2013.01); *H02S 40/30* (2014.12); *H02S 20/23* (2014.12)

(58) Field of Classification Search
CPC .......... H02S 30/10; H02S 40/30; H02S 20/23; F16B 5/0635; F16B 5/0642
See application file for complete search history.

(56) References Cited

U.S. PATENT DOCUMENTS

| | | |
|---|---|---|
| 3,126,182 A | 3/1964 | Stamper |
| 3,180,597 A | 4/1965 | Havener |

(Continued)

FOREIGN PATENT DOCUMENTS

| | | | |
|---|---|---|---|
| CN | 107979326 A | | 5/2018 |
| DE | 102012208480 | * | 1/2012 |

(Continued)

OTHER PUBLICATIONS

ARaymond fastening and grounding clips for photovoltaic systems (PowAR slot) product literature 2019 (Year: 2019).*

(Continued)

*Primary Examiner* — Terrell L McKinnon
*Assistant Examiner* — Ding Y Tan
(74) *Attorney, Agent, or Firm* — Wolf, Greenfield & Sacks, P.C.

(57) ABSTRACT

A mounting system for mounting a solar panel assembly to a base assembly includes a panel support bracket, a base bracket and a clamp configured to exert a compressive force to hold the panel support bracket and the base bracket together. The clamp comprises a V-shaped clamp body that includes a pair of legs that are spring-loaded to oppose an approximation of the legs by an external compressive force. The clamp includes a pair of receiver slots, with each of the pair of receiver slots located on a corresponding one of the pair of legs. The pair of receiver slots collectively provides a clearance to admit the panel support bracket and the base bracket when the legs are compressed together.

27 Claims, 8 Drawing Sheets

(51) Int. Cl.
*F16B 5/06* (2006.01)
*H02S 20/23* (2014.01)

(56) References Cited

U.S. PATENT DOCUMENTS

| | | | | |
|---|---|---|---|---|
| 5,241,727 | A * | 9/1993 | Lee | H01J 29/06 |
| | | | | 24/453 |
| 5,303,885 | A * | 4/1994 | Wade | F16L 3/133 |
| | | | | 248/62 |
| 8,240,109 | B2 * | 8/2012 | Cusson | F24S 80/70 |
| | | | | 52/173.3 |
| 8,590,223 | B2 | 11/2013 | Kilgore et al. | |
| 8,745,935 | B2 | 6/2014 | DuPont et al. | |
| 9,379,660 | B2 | 6/2016 | Al-Haddad et al. | |
| 9,406,827 | B2 | 8/2016 | Ilzhoefer | |
| 9,571,031 | B2 | 2/2017 | Cavieres et al. | |
| 9,882,524 | B2 | 1/2018 | Al-Haddad et al. | |
| 10,211,774 | B2 | 2/2019 | Zhu | |
| 10,240,820 | B2 | 3/2019 | Ash et al. | |
| 10,530,293 | B2 | 1/2020 | Legall et al. | |
| 2008/0053517 | A1 | 3/2008 | Plaisted et al. | |
| 2012/0201601 | A1 | 8/2012 | Rizzo | |
| 2013/0139869 | A1 * | 6/2013 | Nuernberger | H02S 20/00 |
| | | | | 136/251 |
| 2014/0220834 | A1 | 8/2014 | Rizzo | |
| 2016/0282018 | A1 * | 9/2016 | Ash | F24S 25/636 |
| 2017/0261019 | A1 | 9/2017 | Johnson | |
| 2019/0186518 | A1 * | 6/2019 | Legall | F24S 25/634 |
| 2019/0312546 | A1 * | 10/2019 | Legall | H02S 30/00 |

FOREIGN PATENT DOCUMENTS

| | | | |
|---|---|---|---|
| DE | 10 2012 208 480 B3 | 5/2013 | |
| EP | 0 508 977 B1 | 1/1995 | |
| EP | 1787031 A1 * | 5/2007 | B60R 21/20 |
| EP | 3550158 A1 | 10/2019 | |
| WO | WO 2020/076870 A1 | 4/2020 | |

OTHER PUBLICATIONS

Written Opinion and Search Report for PCT/US2019/055260; dated Dec. 27, 2019.
U.S. Appl. No. 17/383,254, filed Jul. 22, 2021, Cavieres Pinilla.

* cited by examiner

SYSTEM FOR MOUNTING SOLAR PANELS

RELATED APPLICATIONS

This application is a national stage filing under 35 U.S.C. § 371 of International Patent Application Serial No. PCT/US2019/055260, filed Oct. 8, 2019, which claims the benefit of U.S. Provisional Patent Application Ser. No. 62/742,713, filed Oct. 8, 2018. The entire contents of these applications are incorporated herein by reference in their entirety.

BACKGROUND

The most common approach to mechanically attach and electrically bond solar panels (e.g., solar photovoltaic (PV) panels) on a mounting structure is by the use of conventional fasteners involving bolts, nuts, washers or rivets. The use of conventional fasteners has several problems. First, panel dimensions and the position of mounting holes in panel frames are not standardized across manufacturers. This lack of standardization forces vendors to custom-build mounting hardware for each solar project to match the specifications of different panels. This extends manufacturing lead times and increases supply chain costs. Second, the use of bolted connections increases the complexity and time required for panel installation, along with the risk of installer error. For example, mounting holes at the bottom of PV panel frames must be manually aligned with mating holes in the supporting structure (e.g. mounting rails), then bolts have to be threaded, washers inserted, and nuts temporarily placed. These steps are taken four times for each PV panel, typically in conditions that are not ergonomic or comfortable for the installers. In each instance, these parts and tools may be missing, lost, stolen, or fall over the panels, potentially causing damage to the solar cells. Finally, nuts and bolts must be tightened at specific torque values, which in practice is very difficult to achieve. Over-torqueing is a common cause for the failure of bolts under high wind loads, whereas under-torqueing may lead to loose bolts and nuts, due to vibrations and other environmental conditions. This adds maintenance costs by requiring constant checking and re-tightening of large numbers of bolts and nuts on site.

PV mounting solutions that rely on conventional bolted connections are common in all major solar markets, including residential and commercial building rooftops, solar carports and canopies, as well as utility scale ground mount applications, both in fixed tilt and trackers. Currently, only a few fasteners provide mechanical attachment of PV panels with integrated bonding without relying on bolted connections and tools are commercially available.

A first type of fastener relies on the use of a lever and a wedge, which together embrace the flange of the PV panel frame and the flange of a supporting member. The wedge may have barbs or indentations that electrically bond the PV panel frame with the supporting member (e.g. US20120201601A1). A second type of fastener relies on a combination of slots and spring-loaded barbed tabs to attach the flanges of PV panel frames and supporting members (e.g. US8,590,223B2; US8,745,935B2; DE102012208480B3; US10,211,774B2; US10,240,820B2).

Although generally effective, the existing commercial solutions present several deficiencies. The designs tend to be complicated to install, by requiring installation without complete visibility, or pre-attachment of fastener into the frame of PV panels, thus frustrating efforts to provide an easily repeatable installation. Moreover, most of these solutions only permit the attachment of PV panels in the so-called landscape configuration, where two rails or beams are placed underneath the panel, providing a maximum of four connection points. This condition hinders the possibility of making use of more connection points to provide a more uniform load distribution against uplift and lateral forces caused by strong wind gusts. It is to these and other deficiencies in the prior art that the present mounting system is directed.

WRITTEN DESCRIPTION

Figure 1:
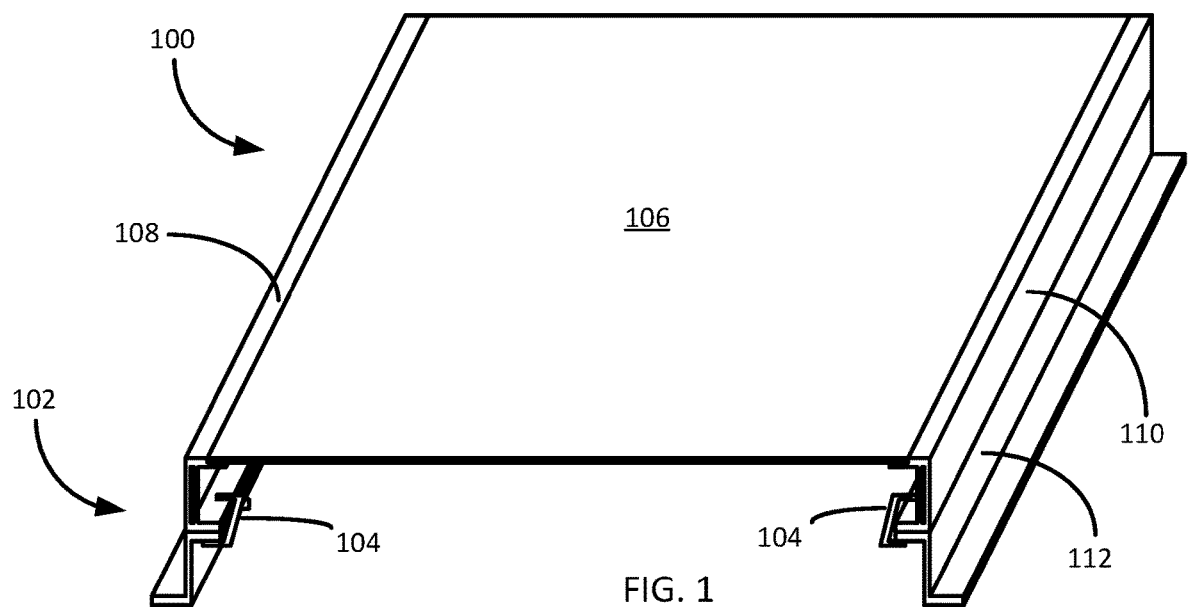
FIG. 1 presents a top perspective view of a solar panel assembly mounted to a support base.

The present disclosure is directed to devices used in solar panel installation, and more particularly, but not by way of limitation, to a system for expediting the attachment of a solar panel on support member, including but not limited to tubes, open section rails, beams, plates, etc. In one aspect, the exemplary embodiments include a mounting system for mounting a solar panel assembly to a base assembly. The mounting system has a panel support bracket, a base bracket and a clamp configured to exert a compressive force to hold the panel support bracket and the base bracket together. The base bracket includes a pair of clamp slots and a pair of alignment stops.

The clamp comprises a V-shaped clamp body that includes a pair of legs that are spring-loaded to oppose an approximation of the legs by an external compressive force. The clamp includes a pair of receiver slots, with each of the pair of receiver slots located on a corresponding one of the pair of legs. The pair of receiver slots collectively provides a clearance to admit the panel support bracket and the base bracket when the legs are compressed together.

The clamp also includes a pair of locking tabs, with each of the pair of locking tabs located on a corresponding one of the pair of legs. Each of the pair of locking tabs is configured to be captured within a corresponding one of the pair of clamp slots to lock the clamp in a fully engaged position on the panel support bracket and the base bracket.

In another aspect, the exemplary embodiments are directed at a clamp for connecting a solar panel assembly to a base assembly. The solar panel assembly has a panel frame that includes a panel support bracket and the base assembly has a base bracket. In this embodiment, the clamp has a plurality of legs that are spring-loaded to oppose an approximation of the legs by an external compressive force. The clamp also includes a pair of receiver slots, with each of the pair of receiver slots located on a corresponding one of the plurality of legs. The receiver slots provide a clearance to admit the panel support bracket and the base bracket within pair of receiver slots when the legs are compressed together. The spring force of the clamp applies a compressive force between the panel support bracket and the base bracket when the external compressive force is removed from the plurality of legs.

In yet another aspect, the exemplary embodiments are directed at a method of connecting a solar panel assembly to a base assembly with a spring-based clamp that has a V-shaped body with a pair of legs that each includes a receiver slot. In this embodiment, the method begins with the step of positioning a panel frame of the solar panel assembly on the base assembly. The method continues with the step of aligning a panel support bracket from the panel frame with a base bracket from the base assembly. Next, the method includes the step of applying an external compressive force to the legs of the clamp to increase a clearance created by the receiver slots in the legs. The method continues with the step of advancing the clamp such that the panel support bracket and the base bracket are accepted within the receiver slots while the clamp is in a compressed state. The method concludes with the step of releasing the external compressive force to allow the clamp to apply a compressive spring force through the receiver slots to the panel support bracket and the base bracket.

Figure 2:
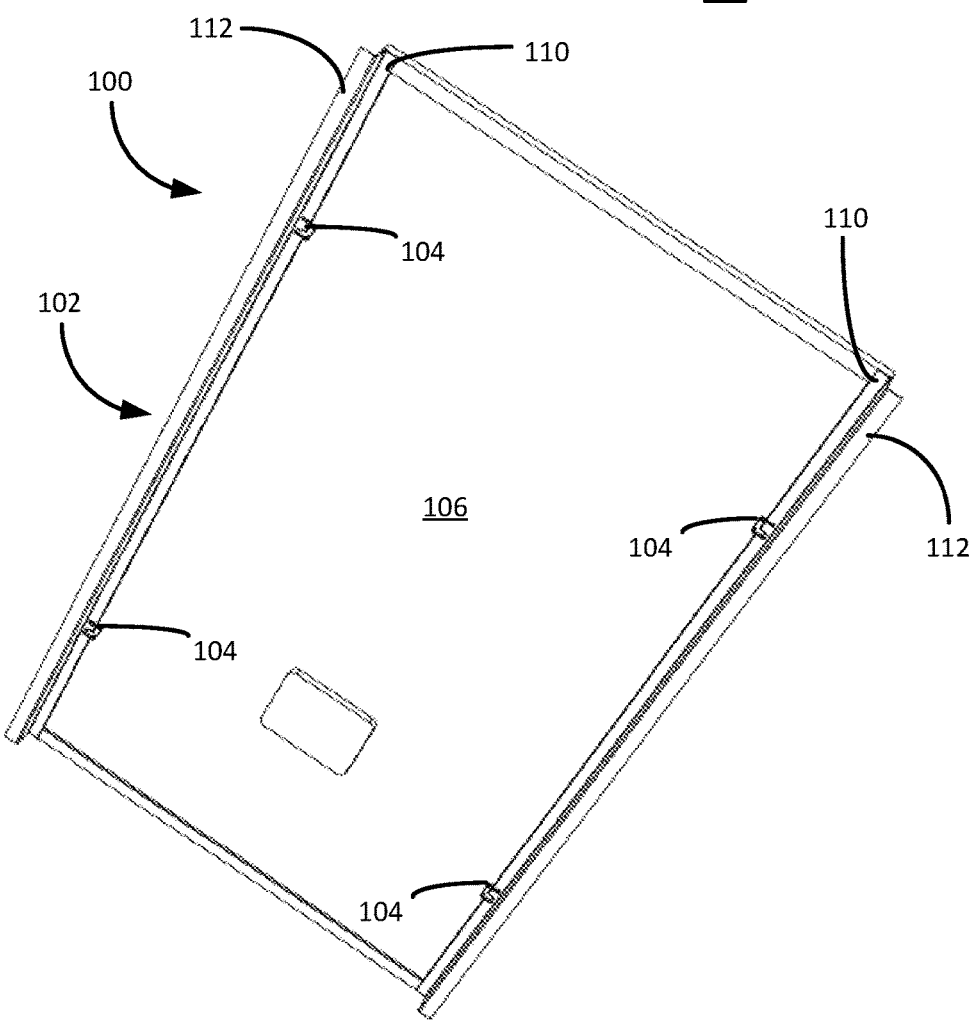
FIG. 2 presents a bottom perspective view of the solar panel assembly and support base of FIG. 1.

Beginning with FIGS. 1 and 2, shown therein are top and bottom perspective views of a solar panel assembly 100 mounted to a base assembly 102 with a plurality of clamps 104. The solar panel assembly 100 includes a photovoltaic (PV) panel 106 attached to a panel frame 108. The panel frame 108 includes one or more panel rails 110 that extend along at least one side of the PV panel 106. In the embodiment depicted in FIGS. 1 and 2, the panel frame 108 includes a pair of panel rails 110 that extend along the length of the PV panel 106. Although a single PV panel 106 is depicted in FIGS. 1 and 2, it will be appreciated that multiple PV panels 106 can be supported by a single panel frame 108, or portions of a single panel frame 108. The panel frame 108 is suitable for supporting a wide variety of PV panels 106.

The base assembly 102 includes one or more base supports 112 (two are shown in FIGS. 1 and 2) that each support a corresponding one of the panel rails 110. The base assembly 102 can be supported by, or attached to, a fixed structure (such as a roof, canopy or ground mounted structure) or to an articulating carrier that adjusts the angular position of the solar panel assembly 100 to optimize the collection of light. For example, the base assembly 102 can be connected to a single axis tracker (SAT) that automatically or programmatically orients the solar panel assembly 100 with respect to a light source.

Figure 3:
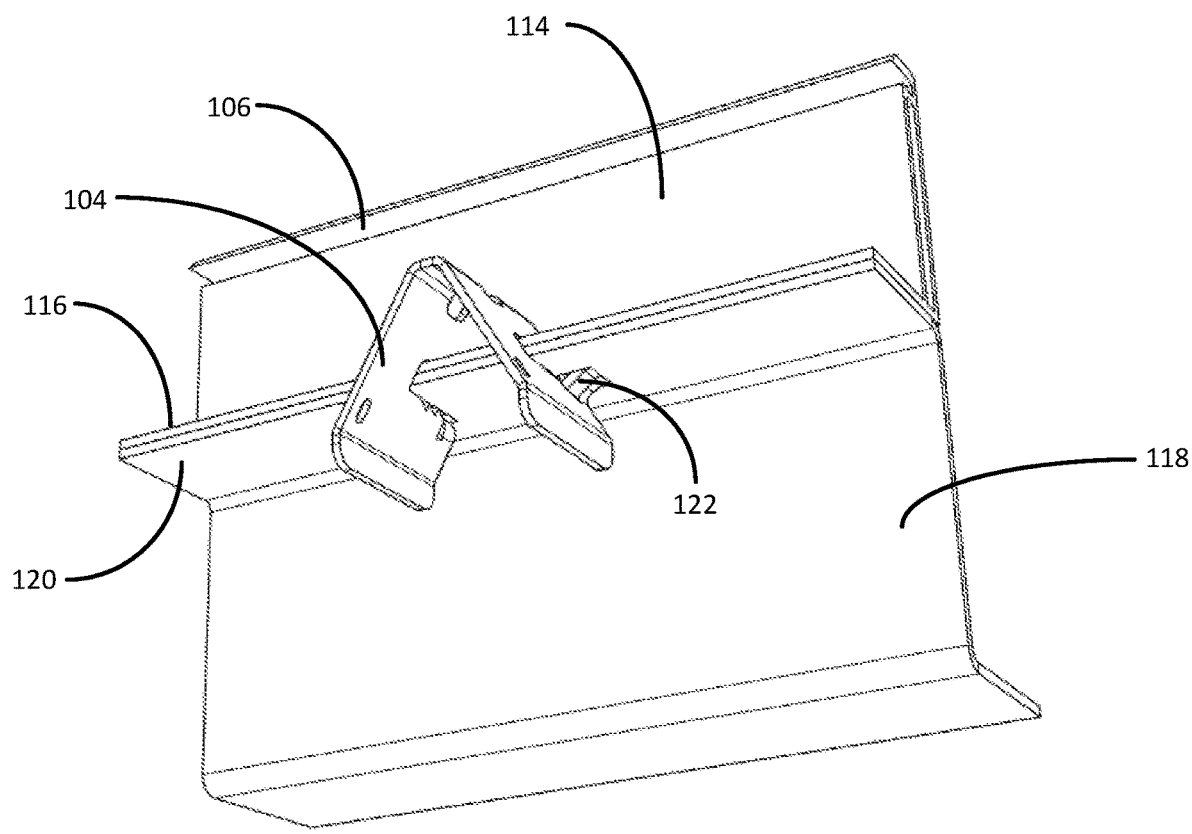
FIG. 3 presents a close-up interior perspective view of the solar panel frame connected to the support base rail.

Turning to FIG. 3, shown therein is an interior perspective view of a portion of the solar panel assembly 100 and base assembly 102. The panel frame 108 includes a panel vertical wall 114 and a panel support bracket 116. The base support 112 includes a base vertical wall 118 and a base bracket 120. During installation, the panel frame 108 is positioned with respect to the base assembly 102 such that the panel support bracket 116 is aligned with the base bracket 120. As noted in FIG. 3, the clamp 104 captures and secures the panel support bracket 116 to the base bracket 120. In many embodiments, the clamps 104, panel rails 110 and base supports 112 are each constructed from an electrically conductive metal.

Figure 4:
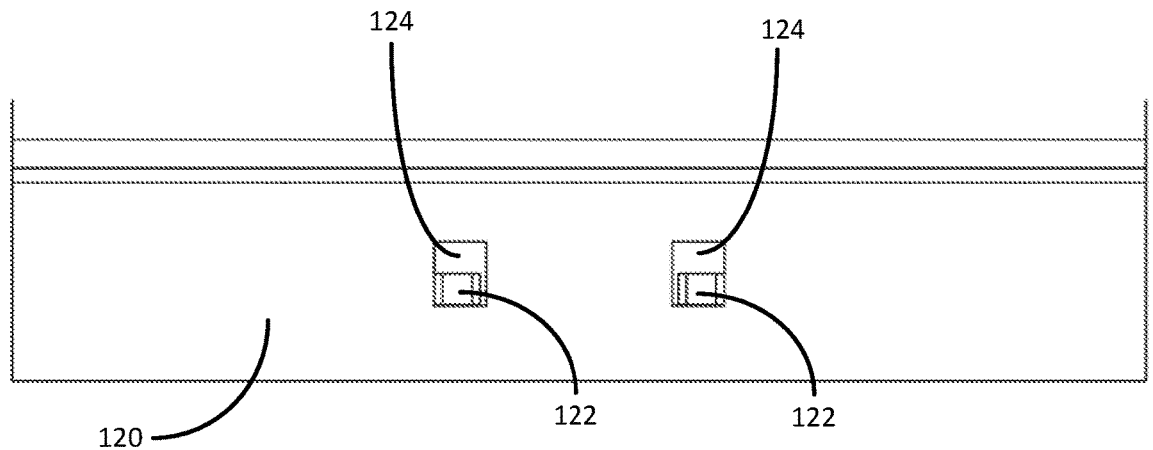
FIG. 4 presents a top view of the base bracket.

As illustrated in the top view of the base bracket 120 in FIG. 4, the base bracket 120 includes alignment stops 122 and clamp slots 124 that engage with the clamp 104. The alignment stops 122 extend downward from the base bracket 120. In some embodiments, the alignment stops 122 are created during manufacture by punching and folding the portion of the base bracket 120 removed to create the clamp slots 124. In other embodiments, a custom punch and die can be used to produce the alignment stops 122 and clamp slots 124 on existing base assemblies 102. Additional views of the alignment stops are presented in FIGS. 9B-9C, FIGS. 10B-10C and FIGS. 11B-11C.

Figure 5:
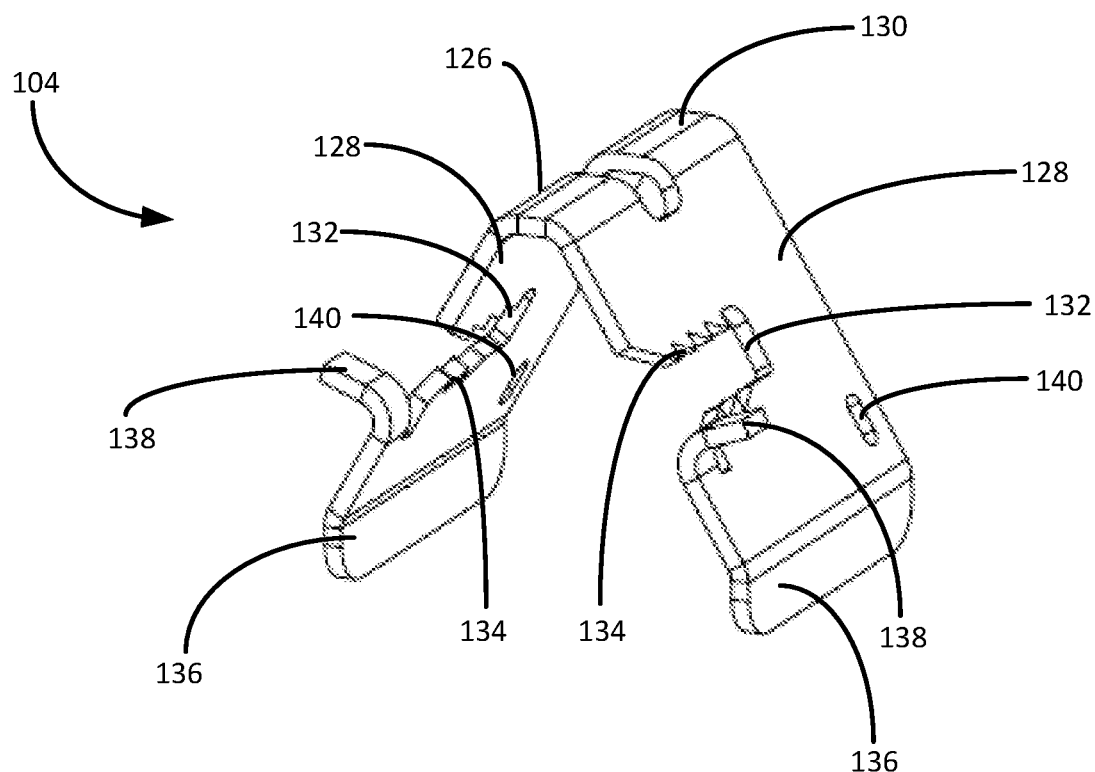
FIG. 5 presents a front perspective view of the clamp.
Figure 6:
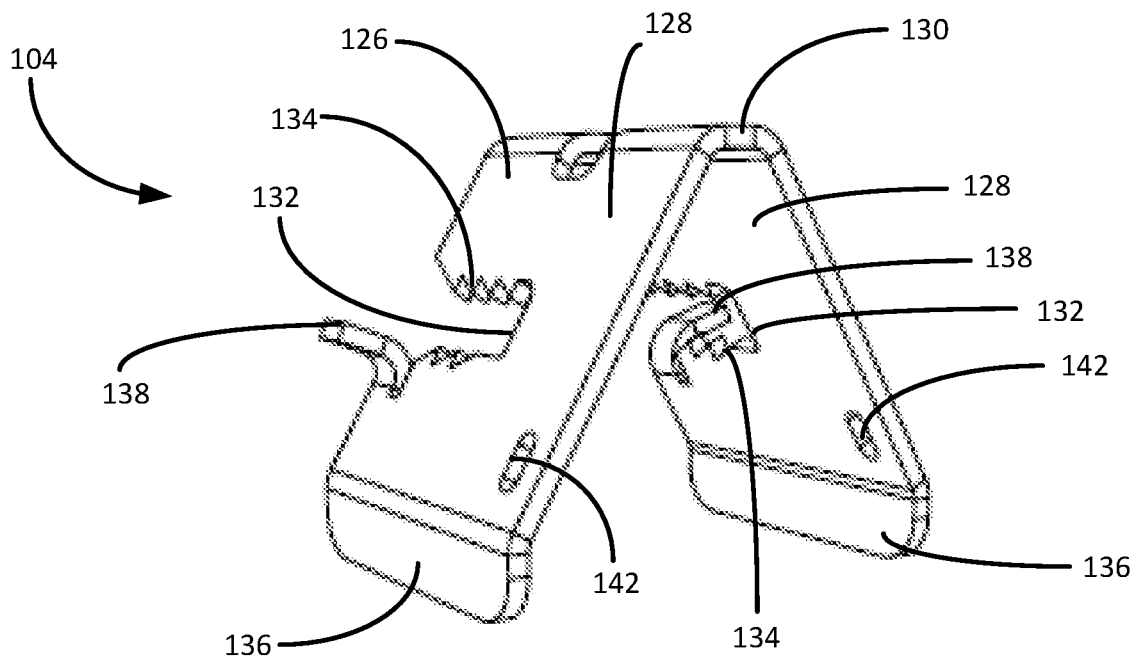
FIG. 6 presents a rear perspective view of the clamp.

Turning to FIGS. 5 and 6, shown therein are front and rear perspective views of the clamp 104. In exemplary embodiments, the clamp 104 is made from a stamped spring-grade steel sheet metal with anti-corrosion properties (e.g., stainless or galvanized). The clamp 104 may be constructed of materials including, but not limited to, metals such as steel, stainless steel, aluminum, and titanium, and metal alloys, ceramic composites, composite reinforced metals, plastics and the like. In one embodiment, the clamp 104 is constructed from a conductive metal to provide a grounding path.

Figure 8:
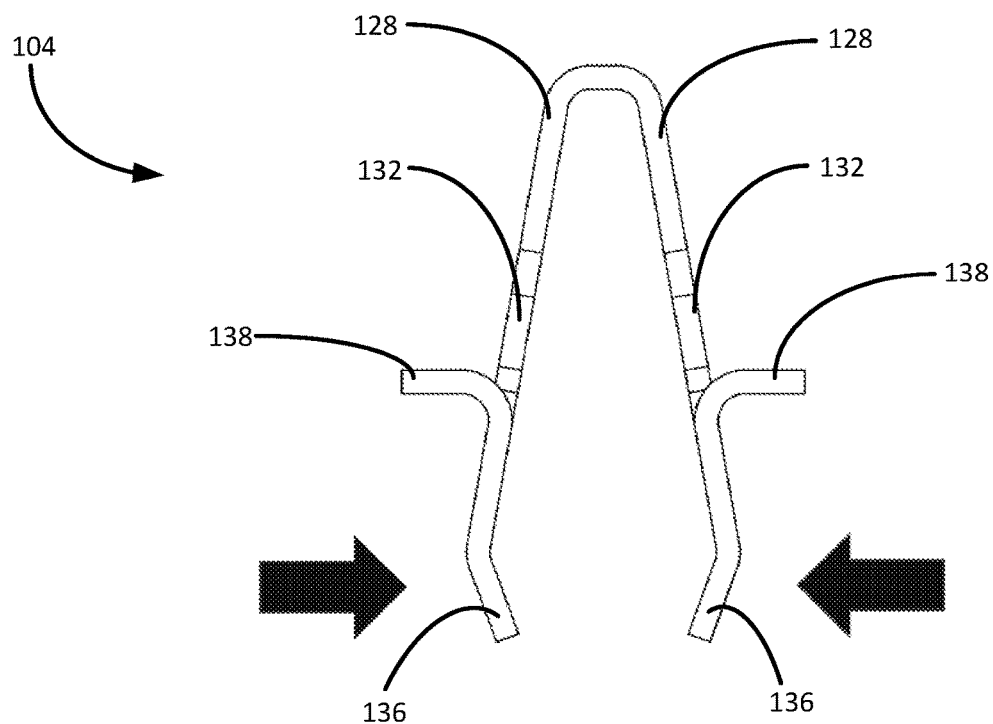
FIG. 8 presents a front view of the clamp in a compressed state.

The clamp 104 includes a clamp body 126 that is substantially "V-shaped," with two or more legs 128 extending away in an oblique angle from a common apex 130. The thickness of the clamp body 126 and the material of construction permit the legs 128 to be approximated or compressed toward one another, as illustrated in FIG. 8. When the compressive force is removed, the spring energy stored within the clamp 104 forces the legs 128 to separate into a relaxed state. In some embodiments, the angle between the two legs 128 is between about 55 and about 75 degrees when the clamp 104 is in a relaxed state. In some embodiments, the legs 128 form an angle from the apex 130 of about 60 degrees when the clamp 104 is in a relaxed state.

Figure 7:
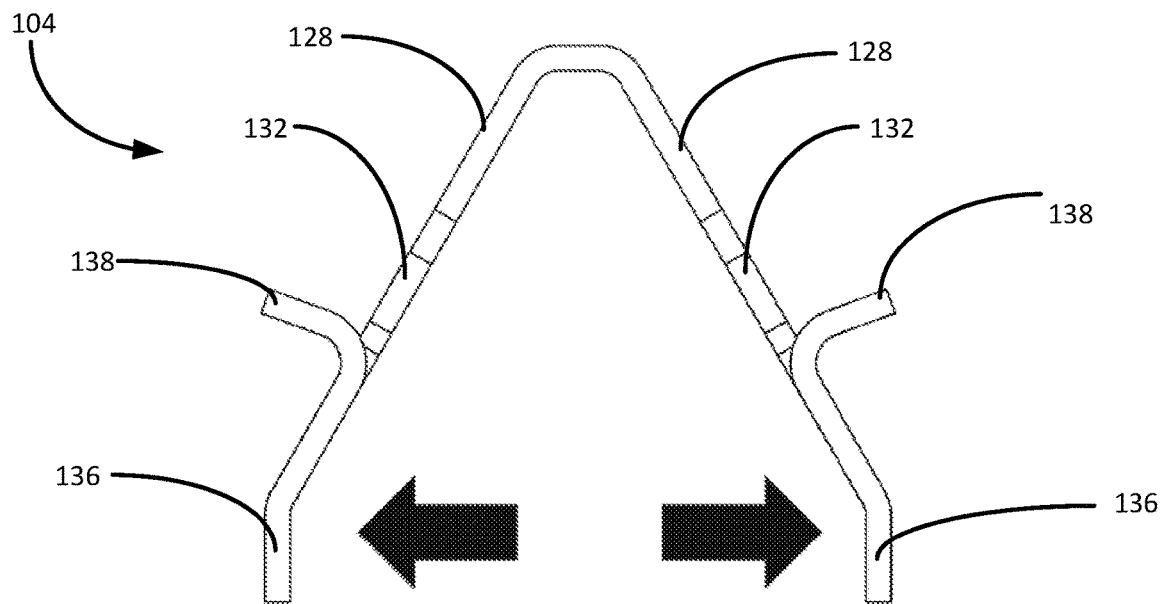
FIG. 7 presents a front view of the clamp in a relaxed state.

Each leg 128 has a receiver slot 132 that extends from the front of the leg 128 to an interior portion of the leg 128. As best illustrated in FIG. 7, the receiver slots 132 are arranged in a substantially normal, or orthogonal, relationship with respect to the legs 128 such that the receiver slots 132 are angled downward in an oblique manner when the clamp 104 is in a relaxed state. Due to the angular disposition of the legs 128 and the orientation of the receiver slots 132 within the legs 128, the receiver slots 132 together provide a first clearance ($C_1$) that represents the height of the linear gap that extends through the two receiver slots 132. When the legs 128 of the clamp 104 are approximated under an external compressive force (as illustrated in FIG. 8), the angular disposition of the legs 128 and the receiver slots 132 is reduced to provide a second clearance ($C_2$) that is greater than the first clearance $C_1$. In some embodiments, the second clearance ($C_2$) is greater than the combined thickness of the panel support bracket 116 and the base bracket 120, while the first clearance ($C_1$) is less than the combined thickness (height) of the panel support bracket 116 and the base bracket 120. In these embodiments, the clamp 104 cannot be introduced over the panel support bracket 116 and base bracket 120 until the combined clearance from the receiver slots 132 is increased by compressing the legs 128 together. When the compressive force is removed from the legs 128, the legs 128 are urged to separate by the spring force of the clamp 104 and the clearance provided by the receiver slots 132 decreases. Because the combined thickness of the panel support bracket 116 and the base bracket 120 is greater than the clearance provided by the receiver slots 132 when the clamp 104 is in a relaxed state, the introduction of the panel support bracket 116 and the base bracket 120 within the receiver slots 132 prevents the clamp 104 from returning to a relaxed state. In this way, the spring force of the clamp 104 exerts an outward force on the legs 128, which is transferred through the receiver slots 132 as a compressive force that holds the panel support bracket 116 and base bracket 120 together.

In some embodiments, each of the receiver slots 132 includes a plurality of teeth 134. The serrated edges of the receiver slots 132 are configured to scratch the surface of the both the panel support bracket 116 and base bracket 120 to increase the frictional resistance between the clamp 104 and the panel support bracket 116 and base bracket 120. The teeth 134 also increase the electrical conductivity between the clamp 104 and the panel support bracket 116 and base bracket 120 by removing any non-conductive coatings applied to the panel support bracket 116 and base bracket 120.

Each leg 128 of the clamp 104 terminates in a foot 136. As best illustrated in FIG. 7, the foot 136 is angularly offset from the leg 128 such that the foot 136 extends in a substantially vertical direction when the clamp 104 is in a relaxed state. The vertical position of the foot 136 facilitates the use of pliers or other tools for compressing the legs 128 of the clamp 104. In some embodiments, each foot 136 includes a slot or hole (not depicted) that is configured to receive a corresponding post or tab on a custom-made tool to facilitate the engagement of the compression tool with the foot 136 of each leg 128.

The clamp 104 also includes a pair of locking tabs 138 that extend outward from the legs 128. The locking tabs 138 have a thickness that is less than the width of the clamp slots 124 in the base bracket 120. During installation, the locking tabs 138 are initially retained between the alignment stops 122 to capture the clamp 104 in a compressed state. Once the clamp 104 advances further onto the panel support bracket 116 and base bracket 120, the locking tabs 138 clear the alignment stops 122 and the legs 128 are allowed to partially open such that and the locking tabs 138 are forced upward within the clamp slots 124. In this fully-engaged position, the locking tabs 138 are captured within the clamp slots 124 to prevent the retraction of the clamp 104 from the panel support bracket 116 and base bracket 120.

Figure 9A:
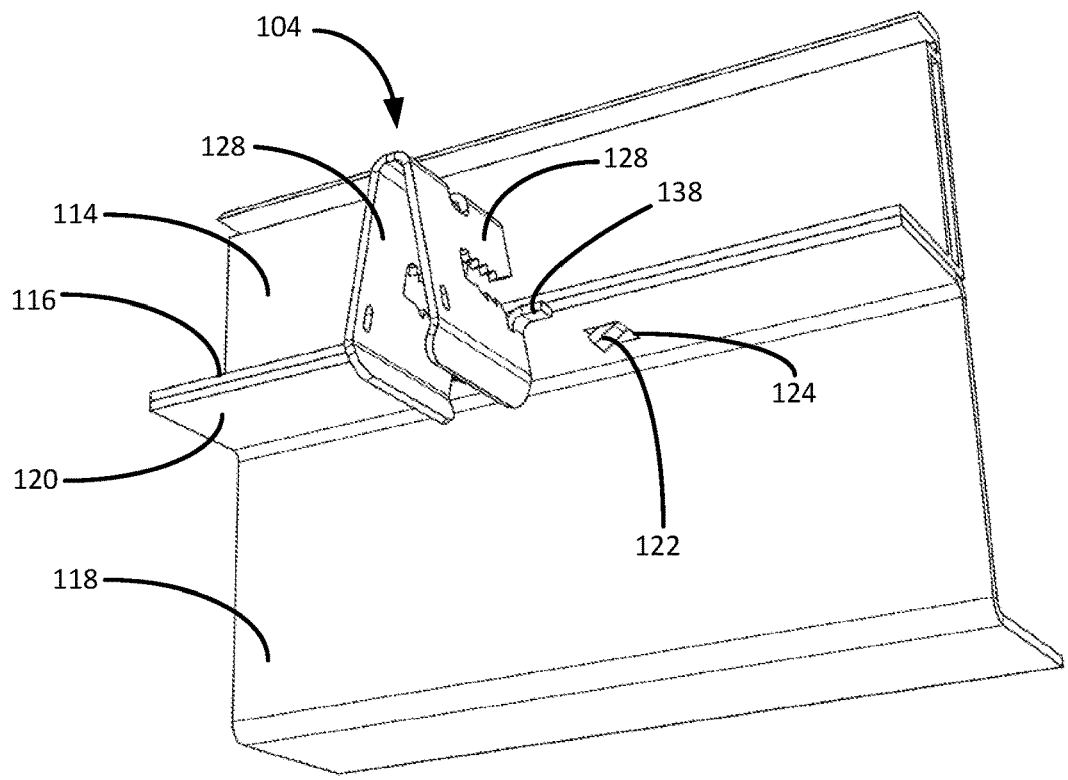
FIG. 9A presents a perspective view of the clamp approaching the panel rail and the base rail.
Figure 9B:
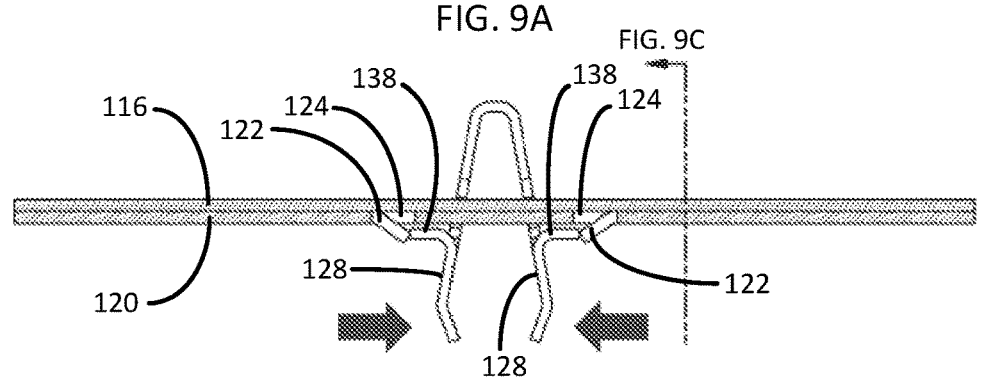
FIG. 9B presents a rear cross-sectional view of the clamp approaching the panel support bracket and the base bracket.
Figure 9C:
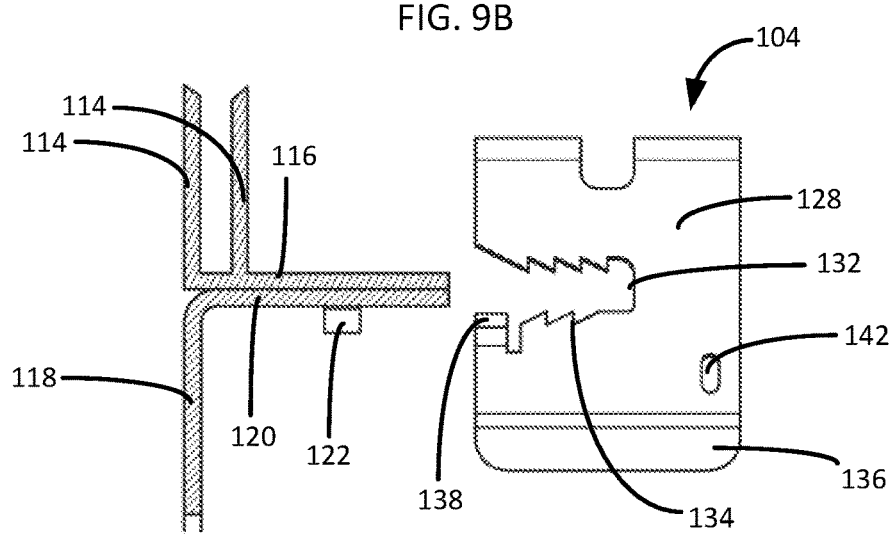
FIG. 9C presents side cross-sectional view of the clamp approaching the panel support bracket and the base bracket.

FIGS. 9-11 demonstrate an exemplary method of installing the clamp 104 onto the panel support bracket 116 and base bracket 120. Beginning with FIGS. 9A-9C, the clamp 104 is laterally aligned with a series of alignment stops 122 on the base bracket 120. Once the panel support bracket 116 and base bracket 120 have been aligned, the legs 128 of the clamp 104 are compressed together with an external compressive force generated by pliers, a custom tool, or the installer's fingers.

Figure 10A:
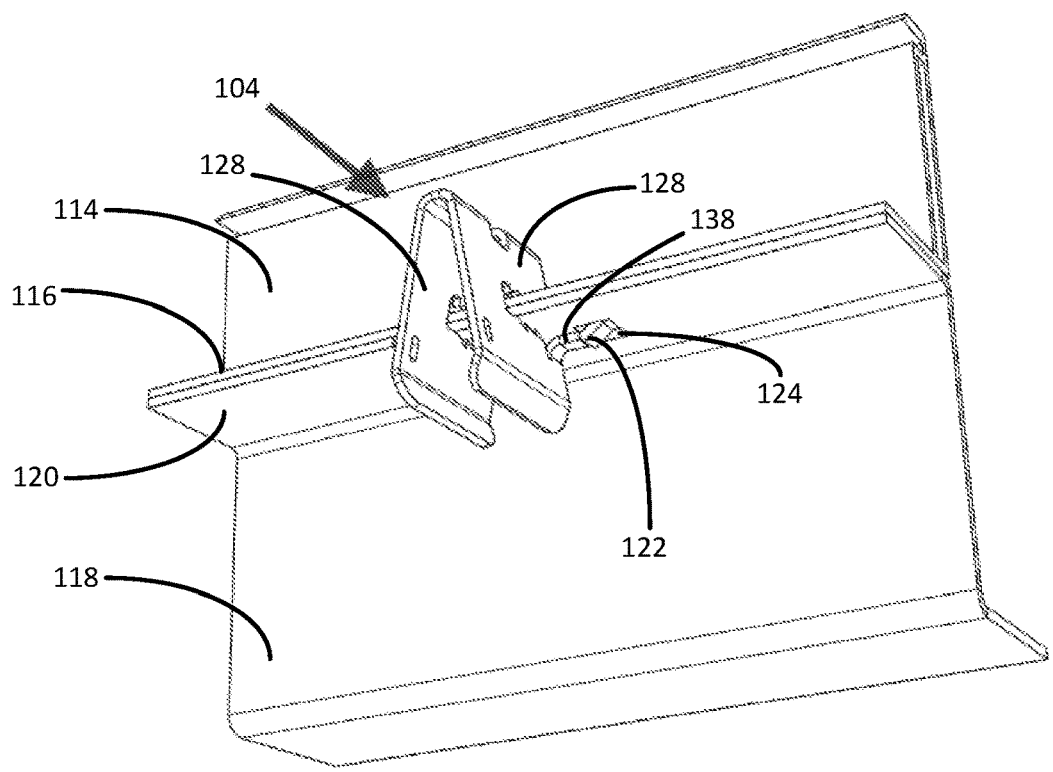
FIG. 10A presents a perspective view of the clamp partially engaged with the panel rail and the base rail.
Figure 10B:
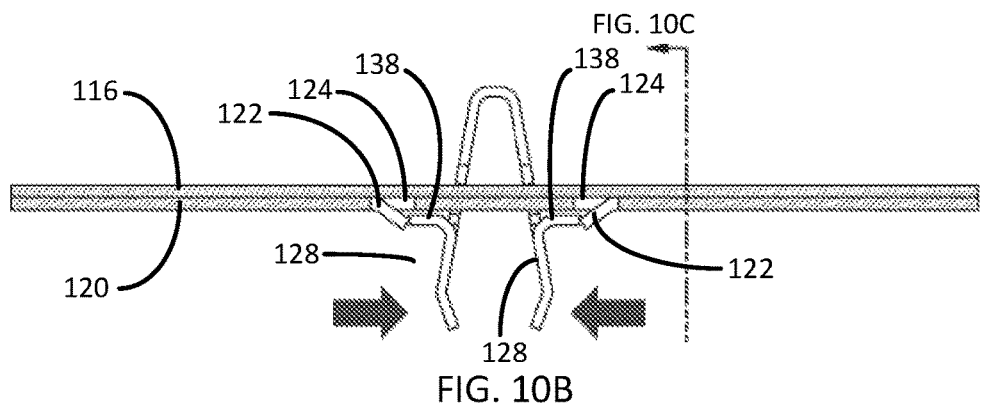
FIG. 10B presents a rear cross-sectional view of the clamp partially engaged with the panel support bracket and the base bracket.
Figure 10C:
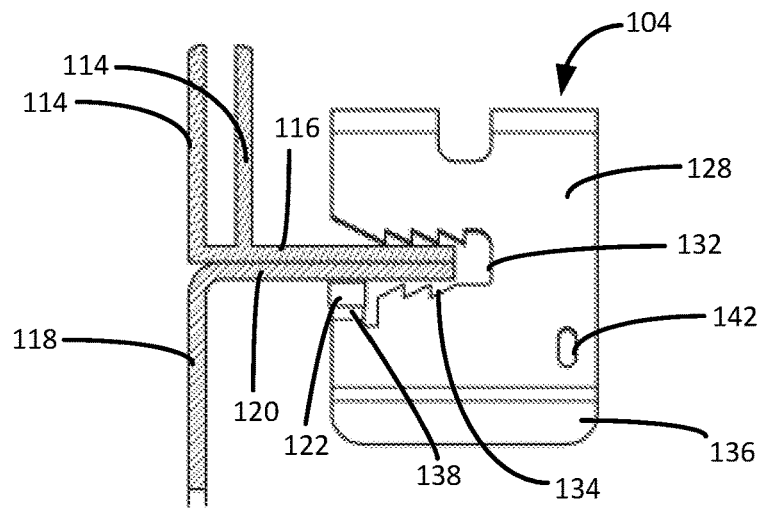
FIG. 10C presents side cross-sectional view of the clamp partially engaged with the panel support bracket and the base bracket.

Once the legs 128 have been compressed to an extent at which the locking tabs 138 will fit between the alignment stops 122, the clamp 104 is pushed forward such that the panel support bracket 116 and base bracket 120 fit within the increased clearance ($C_2$) of the receiver slots 132, as indicated in FIGS. 10A-10C. The progress of the clamp 104 can be paused with the clamp in a partially engaged position while the locking tabs 138 are positioned between the alignment stops 122. The alignment stops 122 oppose the outward spring force exerted by the clamp 104 and the compressive force applied to the feet 136 can be reduced or withdrawn. In this partially engaged position, the installer can verify that the clamp 104 is properly aligned with respect to the panel support bracket 116 and base bracket 120.

Figure 11A:
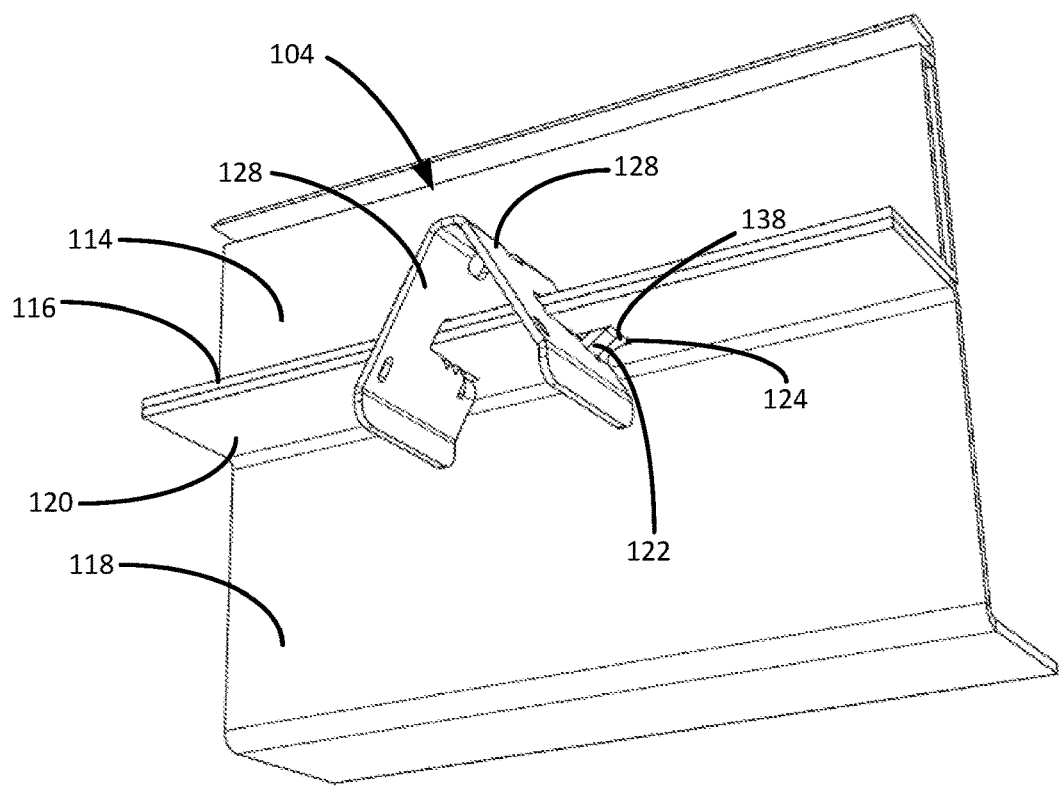
FIG. 11A presents a perspective view of the clamp fully engaged with the panel rail and the base rail.
Figure 11B:
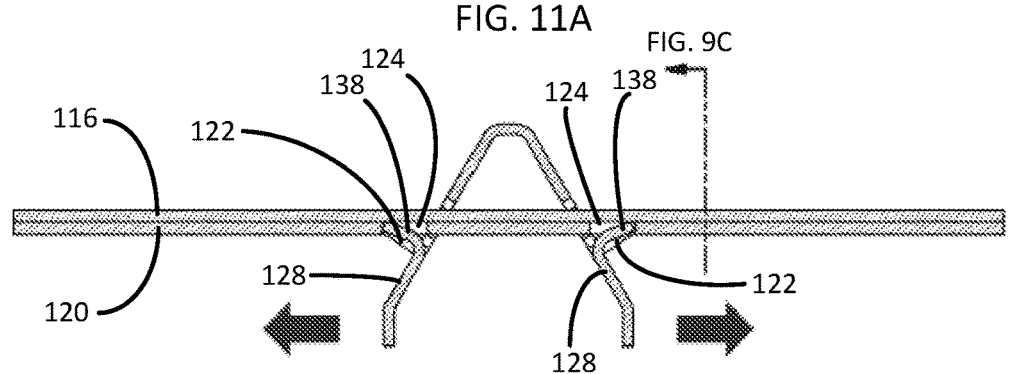
FIG. 11B presents a rear cross-sectional view of the clamp fully engaged with the panel support bracket and the base bracket.
Figure 11C:
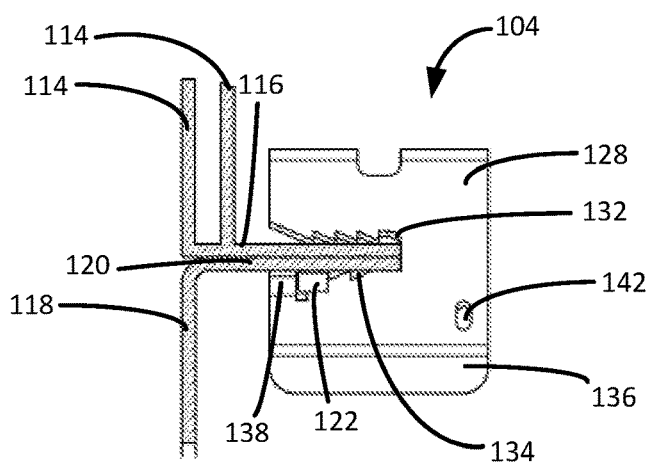
FIG. 11C presents side cross-sectional view of the clamp fully engaged with the panel support bracket and the base bracket.

Next, the clamp 104 is advanced onto the panel support bracket 116 and base bracket 120, as illustrated in FIGS. 11A-11C. Once the locking tabs 138 clear the alignment stops 122, the legs 128 are permitted to partially expand outward and the locking tabs 138 are captured within the clamp slots 124 of the base bracket 120. In this fully engaged position, the clamp 104 exerts a compressive force onto the panel support bracket 116 and base bracket 120 through the serrated receiver slots 132. The alignment stops 122 and clamp slots 124 cooperate to prevent the locking tabs 138 and clamp 104 from being retracted from the panel support bracket 116 and base bracket 120. To unlock and remove the clamp 104, the legs 128 must be compressed together so that the locking tabs 138 can clear the alignment stops 122 as the clamp 104 is withdrawn.

Figure 12A:
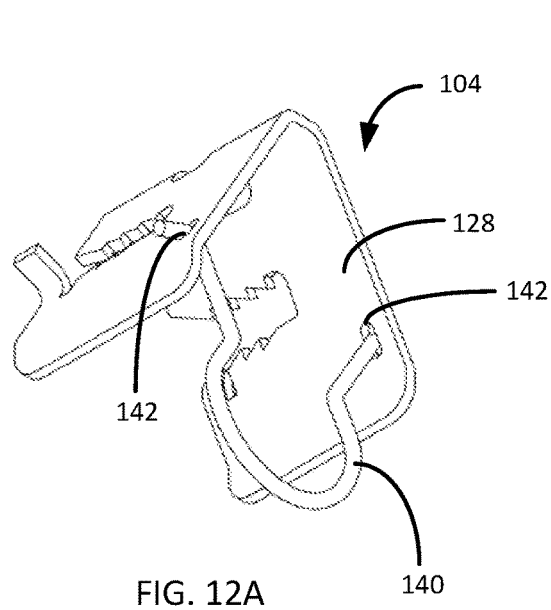
FIG. 12A presents a lower perspective view of the clamp with an optional cable hanger.
Figure 12B:
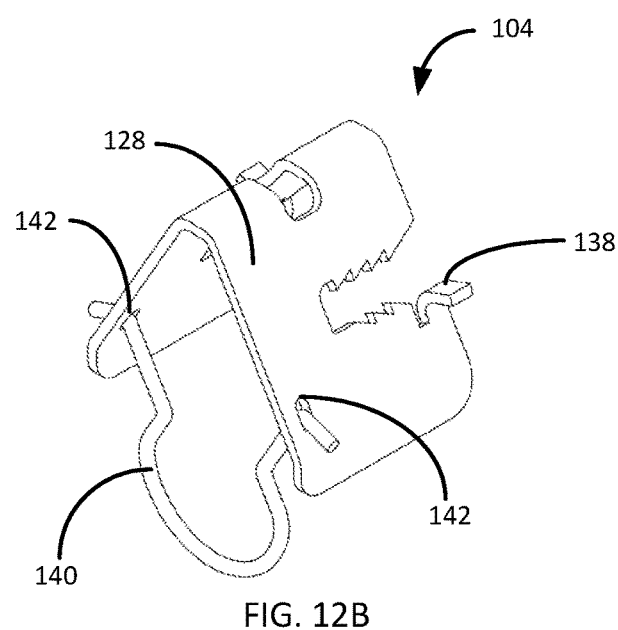
FIG. 12B presents a rear perspective view of the clamp with the optional cable hanger.
Figure 12C:
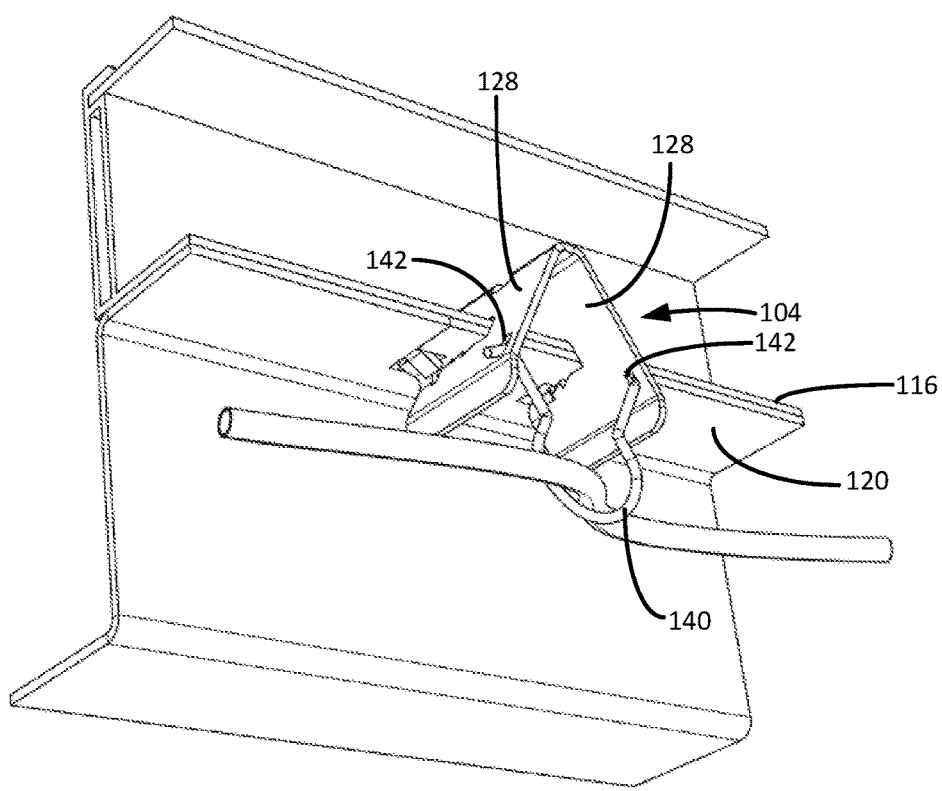
FIG. 12C presents a lower perspective view of the clamp supporting an electrical cable while locking the solar panel assembly to the base assembly.

Turning to FIGS. 12A-12C, shown therein are various depictions of an embodiment in which the clamp 104 includes a cable hanger 140. The cable hanger 140 is configured as a wire loop that is retained in hanger apertures 142 in each leg 128 of the clamp 104. The cable hanger 140 is capable of supporting and organizing electrical cables that are routed beneath the PV panel 106. In exemplary embodiments, the cable hanger 140 can be removed from the hanger apertures 142 by squeezing the cable hanger 140 and removing the ends of the wire loop from the hanger apertures 142.

Thus, the clamp 104, the panel support bracket 116 and the base bracket 120 collectively provide a "mounting system" that facilitates the attachment of the solar panel assembly 100 to the base assembly 102. The mounting system provides several advantages over the prevailing use of bolt fasteners: (1) a single clamp replaces several parts needed for a bolted connection; (2) no torque specification is necessary; (3) it is not necessary to align prefabricated bolt holes on the panel support bracket 116 and base bracket 120; (4) training and quality control requirements are greatly reduced; (5) maintenance costs are substantially reduced because nut tightening and re-torqueing of loose bolts is eliminated; and (6) the clamp 104 can be pre-attached and shipped with the base bracket 120, providing logistic and ergonomic benefits absent in other systems. Further, in most embodiments, the clamp 104 can be installed without the use of tools.

Importantly, although terms of reference such as "horizontal" have been used in this disclosure, it will be understood that the mounting system is equally well suited for securing the solar panel assembly 100 to the base assembly 102 in non-horizontal applications. For example, the clamp 104 can be used to secure the PV panel 106 to a vertically-oriented base assembly 102. Although depictions of the "panel support bracket" and "base bracket" are depicted in horizontal orientation, it will be appreciated that the panel support bracket 116 and base bracket 120 can be used in non-horizontal configurations. It will also be understood that the clamp 104 and other components of the mounting system can be used to connect and assemble structural members used in applications other than supporting solar panels. For example, the clamp 104 may be useful in connecting structural members within the chassis of appliances or to assist with the assembly of metal buildings.

It is to be understood that the present disclosure is not limited in application to the details of methods and apparatus as set forth in the following description. The present disclosure is capable of other embodiments or of being practiced or carried out in various ways. As such, the language used herein is intended to be given the broadest possible scope and meaning; and the embodiments are meant to be exemplary, not exhaustive. Also, it is to be understood that the phraseology and terminology employed herein is for the purpose of description and should not be regarded as limiting unless otherwise indicated as so. Moreover, in the following detailed description, numerous specific details are set forth in order to provide a more thorough understanding of the disclosure. However, it will be apparent to a person having ordinary skill in the art that the embodiments of the present disclosure may be practiced without these specific details. In other instances, features which are well known to persons of ordinary skill in the art have not been described in detail to avoid unnecessary complication of the description.

Unless otherwise defined herein, scientific and technical terms used in connection with the present disclosure shall have the meanings that are commonly understood by those having ordinary skill in the art. Further, unless otherwise required by context, singular terms shall include pluralities and plural terms shall include the singular.

All patents, published patent applications, and non-patent publications mentioned in the specification are indicative of the level of skill of those skilled in the art to which the present disclosure pertains. All patents, published patent applications, and non-patent publications referenced in any portion of this application are herein expressly incorporated by reference in their entirety to the same extent as if each individual patent or publication was specifically and individually indicated to be incorporated by reference.

As utilized in accordance with the methods and apparatus of the present disclosure, the following terms, unless otherwise indicated, shall be understood to have the following meanings:

The use of the word "a" or "an" when used in conjunction with the term "comprising" in the claims and/or the specification may mean "one," but it is also consistent with the meaning of "one or more," "at least one," and "one or more than one." The use of the term "or" in the claims is used to mean "and/or" unless explicitly indicated to refer to alternatives only or when the alternatives are mutually exclusive, although the disclosure supports a definition that refers to only alternatives and "and/or." The use of the term "at least one" will be understood to include one as well as any quantity more than one, including but not limited to, 2, 3, 4, 5, 6, 7, 8, 9, 10, 15, 20, 30, 40, 50, 100, or any integer inclusive therein. The term "at least one" may extend up to 100 or 1000 or more, depending on the term to which it is attached; in addition, the quantities of 100/1000 are not to be considered limiting, as higher limits may also produce satisfactory results. In addition, the use of the term "at least one of X, Y and Z" will be understood to include X alone, Y alone, and Z alone, as well as any combination of X, Y and Z.

As used herein, all numerical values or ranges (e.g., in units of length such as micrometers or millimeters) include fractions of the values and integers within such ranges and fractions of the integers within such ranges unless the context clearly indicates otherwise. Thus, to illustrate, reference to a numerical range, such as 1-10 includes 1, 2, 3, 4, 5, 6, 7, 8, 9, 10, as well as 1.1, 1.2, 1.3, 1.4, 1.5, etc., and so forth. Reference to a range of 1-50 therefore includes 1, 2, 3, 4, 5, 6, 7, 8, 9, 10, 11, 12, 13, 14, 15, 16, 17, 18, 19, 20, etc., up to and including 50, as well as 1.1, 1.2, 1.3, 1.4, 1.5, etc., 2.1, 2.2, 2.3, 2.4, 2.5, etc., and so forth. Reference to a series of ranges includes ranges which combine the values of the boundaries of different ranges within the series. Thus, to illustrate reference to a series of ranges, for example, of 1-10, 10-20, 20-30, 30-40, 40-50, 50-60, 60-75, 75-100, 100-150, 150-200, 200-250, 250-300, 300-400, 400-500, 500-750, 750-1,000, includes ranges of 1-20, 10-50, 50-100, 100-500, and 500-1,000, for example. For example, a reference to a range of 1 mm to 20 mm in thickness is intended to explicitly include all units of measurement in the range.

As used herein, the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

The term "or combinations thereof" as used herein refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, AAB, BBC, AAABCCCC, CBBAAA, CABABB, and so forth. The skilled artisan will understand that typically there is no limit on the number of items or terms in any combination, unless otherwise apparent from the context.

Throughout this application, the terms "about" or "approximately" are used to indicate that a value includes the inherent variation of error. Further, in this detailed description, each numerical value (e.g., thickness, length, temperature or time) should be read once as modified by the term "about" (unless already expressly so modified), and then read again as not so modified unless otherwise indicated in context. As noted above, any range listed or described herein is intended to include, implicitly or explicitly, any number within the range, particularly all integers, including the end points, and is to be considered as having been so stated. For example, "a range from 1 to 10" is to be read as indicating each possible number, particularly integers, along the continuum between about 1 and about 10. Thus, even if specific data points within the range, or even no data points within the range, are explicitly identified or specifically referred to, it is to be understood that any data points within the range are to be considered to have been specified, and that the inventors possessed knowledge of the entire range and the points within the range. Unless otherwise stated, the term "about" or "approximately", where used herein when referring to a measurable value such as an amount, length, thickness, a temporal duration, and the like, is meant to encompass, for example, variations of ±20% or ±10%, or ±5%, or ±1%, or ±0.1% from the specified value, as such variations are appropriate to perform the disclosed methods and as understood by persons having ordinary skill in the art.

As used herein, the term "substantially" means that the subsequently described parameter, event, or circumstance completely occurs or that the subsequently described parameter, event, or circumstance occurs to a great extent or degree. For example, the term "substantially" means that the subsequently described parameter, event, or circumstance occurs at least 80% of the time, or at least 90%, or at least 91%, or at least 92%, or at least 93%, or at least 94%, or at least 95%, or at least 96%, or at least 97%, or at least 98%, or at least 99%, of the time, or means that the dimension or measurement is within at least 90%, or at least 91%, or at least 92%, or at least 93%, or at least 94%, or at least 95%, or at least 96%, or at least 97%, or at least 98%, or at least 99%, of the referenced dimension or measurement (e.g., length or thickness).

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

It should be understood at the outset that, although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

What is claimed is:

1. A clamp for connecting a structure to a bracket, the clamp comprising:
    at least two legs configured to move between a first compressed configuration with the at least two legs compressed towards one another and a second engaged configuration; and
    a plurality of receiver slots, each of the plurality of receiver slots formed in a respective one of the at least two legs, wherein the plurality of receiver slots are configured to receive a portion of the structure and a portion of the bracket therein, wherein a linear gap extends through the plurality of receiver slots for receiving the portion of the structure and the portion of the bracket, wherein the linear gap has a first clearance within the plurality of receiver slots in the first compressed configuration and a second clearance within the plurality of receiver slots in the second engaged configuration, wherein the first clearance in the first compressed configuration is greater than the second clearance in the second engaged configuration, and wherein the clamp is configured to approximate the structure and the bracket when the at least two legs are moved towards the second engaged configuration.

2. The clamp of claim 1, further comprising a plurality of locking tabs, each of the plurality of locking tabs formed in a respective one of the at least two legs, the plurality of locking tabs configured to engage with a plurality of clamp slots formed in the bracket, wherein engagement of the plurality of locking tabs with the plurality of clamp slots prevents lateral movement of the clamp.

3. The clamp of claim 2, further comprising a plurality of alignment stops formed in the bracket, wherein the plurality of locking tabs is configured to be captured between the plurality of alignment stops when the clamp is in a partially engaged configuration.

4. The clamp of claim 1, wherein each of the plurality of receiver slots comprises a plurality of teeth.

5. The clamp of claim 1, further comprising a cable hanger supported by a plurality of hanger apertures, each of the plurality of hanger apertures formed in a respective one of the at least two legs.

6. The clamp of claim 5, wherein the cable hanger is configured to support a cable.

7. The clamp of claim 1, wherein the bracket is part of a base assembly, and wherein the structure is part of a solar panel assembly.

8. The clamp of claim 1, wherein the clamp comprises a V-shaped clamp body.

9. A method of connecting a structure to a bracket with a clamp, the method comprising:
    applying an external force to at least two legs of the clamp to compress the at least two legs towards one another to increase a clearance of a linear gap extending through a plurality of receiver slots for receiving a portion of the structure and a portion of the bracket, wherein each of the plurality of receiver slots is formed in a respective one of the at least two legs;
    receiving the portion of the structure and the portion of the bracket in the plurality of receiver slots; and
    removing the external force applied to the at least two legs to move the at least two legs apart and reduce the clearance of the linear gap and approximate the portion of the structure and the portion of the bracket.

10. The method of claim 9, wherein removing the external force applied to the at least two legs further comprises engaging a plurality of locking tabs formed in the at least two legs with a plurality of clamp slots formed in the bracket to prevent lateral movement of the clamp.

11. The method of claim 10, further comprising capturing the plurality of locking tabs with a plurality of alignment stops formed in the bracket when the clamp is in a partially engaged configuration.

12. The method of claim 9, further comprising scratching a surface of the structure and a surface of the bracket with a plurality of teeth of the plurality of receiver slots.

13. The method of claim 9, further comprising supporting a cable with the bracket.

14. The method of claim 9, wherein the bracket is part of a base assembly, and wherein the structure is part of a solar panel assembly.

15. A mounting system for mounting a solar panel assembly to a base assembly, the mounting system comprising:
    a panel support structure of the solar panel assembly;
    a bracket of the base assembly; and
    a clamp configured to approximate the panel support structure and the bracket, the clamp comprising:
        at least two legs configured to move between a first compressed configuration with the at least two legs compressed towards one another and a second engaged configuration; and a plurality of receiver slots, each of the plurality of receiver slots formed in a respective one of the at least two legs, wherein the plurality of receiver slots are configured to receive a portion of the panel support structure and a portion of the bracket therein, wherein a linear gap extends through the plurality of receiver slots for receiving the portion of the panel support structure and the portion of the bracket, wherein the linear gap has a first clearance within the plurality of receiver slots in the first compressed configuration that is greater than a second clearance of the linear gap within the plurality of receiver slots in the second engaged configuration, and wherein the clamp is configured to approximate the panel support structure and the bracket when the at least two legs are moved towards the second engaged configuration.

16. The mounting system of claim 15, further comprising a plurality of locking tabs, each of the plurality of locking tabs formed in a respective one of the at least two legs, the plurality of locking tabs configured to engage with a plurality of clamp slots formed in the bracket, wherein engagement of the plurality of locking tabs with the plurality of clamp slots prevents lateral movement of the clamp.

17. The mounting system of claim 16, further comprising a plurality of alignment stops formed in the bracket, wherein the plurality of locking tabs is configured to be captured between the plurality of alignment stops when the clamp is in a partially engaged position.

18. The mounting system of claim 15, wherein each of the plurality of receiver slots comprises a plurality of teeth.

19. The mounting system of claim 18, wherein the plurality of teeth are configured to scratch the panel support structure and the bracket.

20. The mounting system of claim 15, further comprising a cable hanger supported by a plurality of hanger apertures, each of the plurality of hanger apertures formed in the respective one of the at least two legs.

21. The mounting system of claim 20, wherein the cable hanger is configured to support a cable.

22. The mounting system of claim 15, wherein the clamp comprises a V-shaped clamp body.

23. The clamp of claim 1, wherein each receiver slot of the plurality of receiver slots is coplanar with an associated leg of the at least two legs when the clamp is in a relaxed state.

24. The clamp of claim 1, wherein the linear gap is a gap formed between opposing edges of each receiver slot formed in an associated leg of the at least two legs.

25. The clamp of claim 1, wherein each receiver slot of the plurality of receiver slots includes two edges that are integrally formed in and extend into the respective one of the at least two legs.

26. The method of claim 9, wherein each receiver slot of the plurality of receiver slots includes two edges that are integrally formed in and extend into the respective one of the at least two legs.

27. The mounting system of claim 15, wherein each receiver slot of the plurality of receiver slots includes two edges that are integrally formed in and extend into the respective one of the at least two legs.

* * * * *